(Model.)
D. M. & J. A. FULWILER.
ADDING MACHINE.
No. 251,567. Patented Dec. 27, 1881.
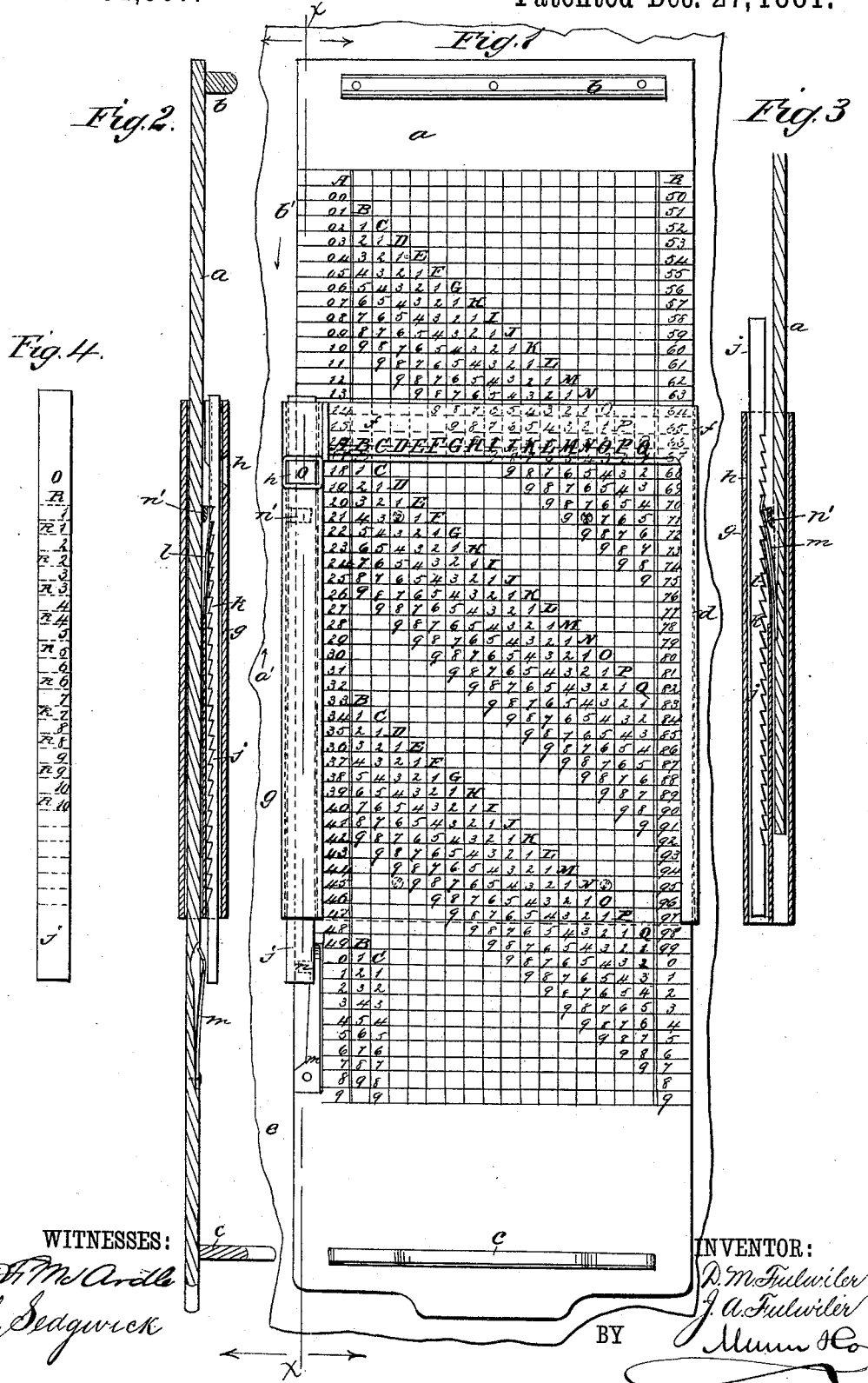
WITNESSES:
F. M'Ardle
C. Sedgwick
INVENTOR:
D. M. Fulwiler
J. A. Fulwiler
BY Munn & Co
ATTORNEYS.

UNITED STATES PATENT OFFICE.

DAVID M. FULWILER AND JAMES A. FULWILER, OF LEXINGTON, ILLINOIS.

ADDING-MACHINE.

SPECIFICATION forming part of Letters Patent No. 251,567, dated December 27, 1881.

Application filed May 5, 1881. (Model.)

*To all whom it may concern:*

Be it known that we, DAVID MAHON FULWILER and JAMES ALVIN FULWILER, both of Lexington, county of McLean, and State of Illinois, have invented certain Improvements in Adding-Machines, of which the following is a specification.

The object of our invention is to provide a new and improved apparatus for facilitating adding numbers, and to enable persons not acquainted with the addition-table to add numbers.

The invention consists in a board divided into longitudinal columns, each provided with an index letter and containing rows of numbers, which board slides in a frame attached to a base, and provided with a transverse rule or strip above the board, and provided with subdivisions corresponding with and indexed the same as the columns on the board, with which they coincide, this frame being also provided with a longitudinal casing at one end, containing a slide with numerals on the upper surface, showing through a slot in this casing, and with ratchet-teeth on the lower side, in which teeth a spring-pawl, $m$, in the sliding board catches.

In the accompanying drawings, Figure 1 is a plan view of my improved adding-machine. Fig. 2 is a longitudinal sectional elevation of the same on the line $x$ $x$, Fig. 1. Fig. 3 is a longitudinal sectional elevation of the casing and the sliding ratchet-bar therein. Fig. 4 is a plan view of the upper side of the sliding ratchet-bar.

Similar letters of reference indicate corresponding parts.

The board or plate $a$ is divided into eighteen longitudinal columns or subdivisions, designated by consecutive letters A B C, &c., to R, inclusive, which are printed, painted, or stamped on the board or plate $a$. The numerals 0 to 49 and from 0 to 9 are printed in the columns A, and the figures from 50 to 99 and from 0 to 9 in the column R, these columns A and R being at the left and right hand margins of the board, respectively. The board is also ruled transversely, the numerals 0 and 50, 1 and 51, 2 and 52, &c., being on the same transverse lines, respectively. The numerals 1 to 9 are arranged in the column B, the numeral 1 being on the same transverse line with the numeral 2 of the column A. The numerals 1 to 9 are also arranged in the column C, the numeral 1 of the column C being one transverse line below the numeral 1 of the column B. In a like manner the numerals 1 to 9 are arranged in the remaining longitudinal columns, the numeral 1 of each column being one transverse line below the numeral 1 of the preceding longitudinal column, so that all the numerals 1 1 1, 2 2 2, 3 3 3, &c., will be arranged in diagonal lines across the board. The numerals 1 2 3 to 9 are also arranged farther down in the longitudinal columns, the numerals 1 of the column B being on the same transverse line with the numerals 18 and 34, respectively, of the column A, and the numerals of the remaining longitudinal columns being arranged in diagonal lines in the manner described above. The letters and numbers are preferably printed or painted in different colors, so that they can be more readily distinguished.

The board $a$ is provided with a transverse projecting strip, $b$, at the upper end, and with a handle-strip, $c$, at the lower end. This board $a$ slides in grooved guides $d$, which are on a base, $e$, and are connected by a flat strip or ruler, $f$, resting on the surface of the board $a$. This transverse strip or rule $f$ is provided with subdivisions corresponding to the same columns on the board $a$, and has the same index-letters. A tubular casing, $g$, parallel with one of the guides $d$, and attached thereto, is provided with a slot or aperture, $h$, in its upper surface, at the upper end, and contains a rod, $j$, having the numeral 0 and the letter R, and then the numerals 1 1, 2 2, 3 3, to 10 10, arranged thereon, one below the other, every second numeral of a kind being provided with the index-letter R. The under side of this rod $j$ is provided with ratchet-teeth $k$, inclined toward the lower end, and a spring-pawl, $l$, of the frame $e$ rests against these teeth and prevents the sliding strip or rod $j$ from being moved in the reverse direction of the arrow $a'$. A spring-pawl, $m$, with a tooth, $n$, is attached to the board $a$ near the lower end of the same, at the left-hand edge of the same, and catches in the teeth $k$ when the board $a$ is moved in the direction of the arrow $a'$.

The operation is as follows: Before beginning to add, the board $a$ is drawn downward until the letter A at the top thereof shall appear just below the lower edge of the strip $f$, and the slide $j$ is so adjusted that the character 0 shows through the slot $h$. For example, the following numerals shall be added together, $9+8+6+7+2+9+4+1+6+8=60$, to show the operation of the device. The board $a$ is moved upward—that is, in the direction of the arrow $a'$—until the numeral 9 in the column A is directly below the edge of the strip $f$. Then by running the eye across the board to the right the letter J is found to be immediately below the lower edge of the strip $f$, and therefore the next numeral, 8, is taken from the column headed by J. The board is then moved upward again until the numeral 8 of column J is immediately below the strip. The sum of 9 and 8 (17) is seen in the column A on the same transverse line with the numeral 8 of the column J. The letter B is now directly below the strip $f$, and the board is moved in the direction of the arrow $a'$ until the next numeral to be added (6) of the column B is below the strip $f$, and the result (23) can be seen (on the transverse line of the numeral 6) on the column A. 7, 2, 9, 4, and 1 are added in the same manner, the result being 46, and the letter O being directly below the strip $f$. If the board $a$ is moved in the direction of the arrow $a'$ until the next number to be added (6) of the column O is directly below the strip $f$, the pawl $m$ catches in the teeth of the slide $j$ and moves the same in the direction of the arrow $a'$, so that the letter R will appear in the slot $h$ and the lower numeral, 2, show below the strip $f$ in the columns A and R. The board $a$ is then moved in the inverse direction of the arrow $a'$ until the uppermost numeral, 2, of the column A is directly below the strip $f$. Then the entire result, 52, will be directly below the strip $f$ in the column R. The letter C is directly below the strip $f$, and the board $a$ is moved in the direction of the arrow $a'$ until the next numeral to be added (8) of the column C is below the strip $f$. If the result reaches or passes 100, the slide $j$ will be moved (by the pawl $m$) to show 1 in the slot $h$, and the results are shown in the column A, 100 being added to such result. If the result is more than 100, the board $a$ must be moved in the inverse direction of the arrow $a'$ until the number above 100 shows below the strip $f$ in the column A, as has been described above, where the result was 52, and the board had to be adjusted on the column A before proceeding. If the result is greater than 150, R 1 will appear in the slot $h$, and if the result is greater than 200, 2 will appear in the slot $h$. For 250, R 2 will appear, and so on.

The hundreds will show in the slot and the units and tens on the columns A and R. If the plain numerals appear in the slot $h$, the result will appear on the column A, and if R and a numeral appear the result will appear on the column R, the number of hundreds shown in the slot being always added to this result. If the machine is made very long, the column R can be dispensed with; but we prefer the arrangement shown. When a column of figures has been added the number to be carried must be made to appear in the marginal columns by setting the board so that the strip or ruler $f$ will be at that number of the marginal column. If it is in column A, set the slide $j$ at O. If it is in column R, set the slide $j$ so that R will appear in the slot, and then proceed as before.

The casing $g$ is provided with a beveled lug or cam, $n'$, which projects over one edge of the face of the board in such manner that a lateral lip on the spring-pawl $m$, which is secured in a recess in said board, will come in contact with the beveled end of said cam, and be lifted over said cam as the board is moved upward, causing the said spring-pawl to engage with a tooth in the strip $j$, and thereby move the strip $j$ upward with it until the said lip passes over and slips off the cam. When the board $a$ has been moved upward until the spring-pawl $m$ passes entirely beyond the cam it may be drawn down, and the lip of the pawl will pass under the cam without obstruction.

With this machine persons not acquainted with the addition-table can add any desired numbers.

Having thus fully described our invention, we claim as new and desire to secure by Letters Patent—

1. An adding-machine made substantially as herein shown and described, and consisting of a sliding board having numerals arranged thereon in longitudinal and diagonal rows, each longitudinal row provided with an index-letter, in combination with a fixed ruler resting above the board, as set forth.

2. In an adding-machine, the combination, with the sliding board $a$, having numerals arranged thereon in indexed longitudinal and in diagonal rows, of the transverse fixed ruler $f$, of the sliding ratchet-bar $j$, having numerals and index-letters on its upper surface, and of a pawl, $m$, on the board $a$, substantially as herein shown and described, and for the purpose set forth.

3. In an adding-machine, the combination, with the sliding board $a$, having numerals arranged thereon in indexed longitudinal and in diagonal rows, of the transverse rule $f$, the casing $g$, parallel with the board $a$, and provided with a slot, $h$, of the ratchet-bar $j$, having numerals and index-letters arranged on its upper surface and contained in the casing $g$, of the pawl $m$, and of the spring-pawl $l$, attached to the base of the machine, substantially as herein shown and described, and for the purpose set forth.

DAVID MAHON FULWILER.
JAMES ALVIN FULWILER.

Witnesses:
AGUSTUS G. WOODWARD,
STEPHEN MERRILL.